Patented Jan. 18, 1944

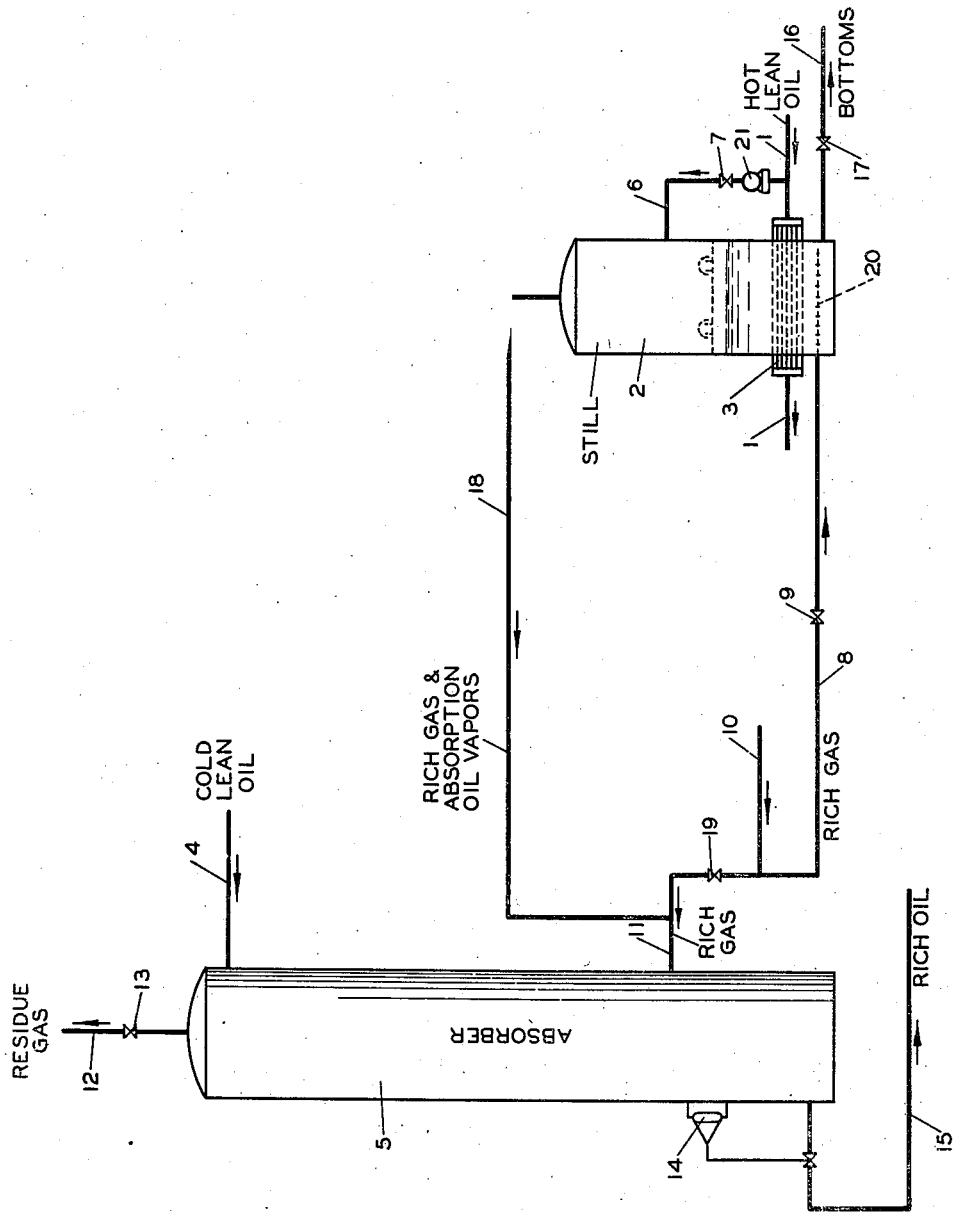

2,339,680

UNITED STATES PATENT OFFICE 2,339,680

ABSORPTION OIL RECLAMATION

Samuel C. Carney, Bartlesville, Okla., assignor to Phillips Petroleum Company, a corporation of Delaware Application July 21, 1941, Serial No. 403,411

6 Claims. (Cl. 196—8)

This invention relates to a process for the continuous distillation of a small portion of the solvent used in absorbing less volatile constituents from hydrocarbon gases. More particularly, it relates to a process for purifying or maintaining in a relatively pure condition absorption oil for use in cyclic absorption processes. It is described, using as an example its application to the recovery of natural gasoline from natural or refinery gases, though it is equally applicable to processes for recovery of such as benzol and its homologues from coal gas.

In conventional absorption systems, the solvent used is usually a petroleum oil having about 350° F. initial and 450° F. final boiling point. In low pressure gasoline absorption plants, about 30 to 40 gallons of absorbent oil is circulated per thousand cubic feet of gas treated, and it is not unusual for the entire charge of absorption oil in the operating cycle to be recirculated as many as one hundred times per day. By this cyclic movement of the oil, which includes its repeated contact with gas containing at times dust, hydrogen sulfide, crude oil spray, carbon dioxide, air, etc., and in the stripping still with steam containing air and frequently entrained inorganic matter, the oil becomes contaminated. The presence of some or all of the materials mentioned, together with the frequent heating and cooling causes chemical changes in the oil itself. These impurities lead to the formation within the oil of high boiling bodies, the result of oxidation and other reactions, as well as accumulation of extraneous impurities.

Probably the most harmful of such accumulations are the chemical products of the oil itself. These materials are soluble in the oil up to a certain point and when this point or saturation is reached, such materials, having the nature of varnish or tar, are deposited in such parts of the system as heat exchangers and coolers. By forming a film on these cooling or heating surfaces, the heat exchange efficiency is greatly lowered.

Attempts have been made to clean or to purify absorption oils by such processes as sedimentation in a surge tank, or treatment by centrifuge. These crude and imperfect processes, nevertheless, were steps forward in attempts to maintain absorption oils in an absorptive condition. These processes, however, removed only insoluble material. Later, distillation by fire and steam has been used, and in principle distillation was a marked improvement over the earlier mechanical methods.

One of the earlier distillation methods for purification of absorption oil was to distill the entire body of absorption oil at intervals determined by the rate of contamination, etc., of said oil. This method was efficient, that is, the oil was well purified since it was an overhead condensate but was uneconomical since the absorption plant must be closed down for this distillation step. The art advanced when a process was introduced for by passing a small portion of the lean absorption oil stream to a separate and distinct distillation unit in which the relatively small amount of impure absorption oil was continuously distilled as an overhead product. In this process, a heater was required to raise the absorption oil to the distillation temperature. The thus heated absorption oil was passed to a still or fractionator which contained a closed or open heater. The absorption oil vapors with or without heating steam passed overhead to condensing coils and the condensate therefrom was conducted to a separator in which water was separated from the purified absorption oil. The latter was then added to the main portion of the lean absorption oil and the combined stream conducted to the absorber or to run storage.

Another process in the advancement of the art consisted in diverting continuously a small proportion of a dirty absorbent oil, either rich or lean, from the main stream and subjecting this diverted portion to direct contact with the same heating medium used in the stripping still. The quantity of heating medium required was that necessary to vaporize the absorbent from the residual foreign matter. The vaporous absorbent and heating medium were then conducted into the main stripping still in which the said vaporous absorbent and heating medium expended their heat content in stripping the absorbed constituents from the rich absorption oil and by this step, the small proportion of purified absorption oil was returned to the main body of absorption oil without loss of heat.

I have discovered a method of purifying absorption oils without the use of open steam. One advantage of my process over open steam distillation methods is that my method is not an attachment to the main stripping still, does not receive stripping medium from it nor deliver vapor into it, but instead is an adjunct to the absorber. As such, it conditions the oil in one respect not accomplished by either fire or steam distillation, and this is with respect to its tendency to emulsify. It is the custom in the trade to buy new absorption oil with stringent specifications as to its tendency to emulsify, for emulsification seriously injures the absorbing properties of oil. It frequently happens in use, however, that the oil develops a tendency to emulsify and in every plant there is some degree of emulsification of the absorption oil, and especially so when open steam is used in distillation. In my process, the absorber oil is maintained relatively dry, first, because steam is not used for purifying the oil and second, the action of the relatively dry gas (in the sense of moisture content) is that it tends to dry the absorption oil of any water content it may already have and to carry out this said water in fixed vapor form in the absorber residue gas, the gas being a non-polar material and a material which is immiscible with the high polar liquid water. By this action of water removal, emulsion formation is essentially eliminated and the absorption oil is maintained in its maximum absorptive conditon.

An object of ths invention is to furnish a process for the continuous purification of absorption oils.

Another object of this invention is to furnish a process for the purification of absorption oils by the continuous distillation of a small portion of the oil without the supply of additional heat.

Still another object of this invention is to furnish a process for the purification of absorption oils by the continuous distillation of a small portion of the oil stream with a stripping medium of non-polar character, as distinguished from the polar medium used in distilling cycle oil when open steam stills are used.

And still another object is to provide a purification method equally suited for use when the main plant still is a first still operated without the use of steam.

Still other objects and advantages will be apparent to those skilled in the art from a careful study of the following disclosure.

The figure is a diagrammatic view of the preferred embodiment of my invention.

My process may be more clearly understood by referring to the figure in which line 1 is the hot lean oil line from the stripping still of a conventional absorption plant. This hot lean oil line is cut at a convenient point and there is set into it a distilling vessel 2 which is merely a simple vessel of suitable size containing near its base a heat exchange element 3. Approximately 99 per cent or more of the normally hot stripped oil flows through the heat exchange element 3 and out into the original hot stripped oil line whence it passes by pumps, heat exchangers, and coolers of the normal absorption cycle (not shown) and is delivered as cold lean oil by line 4 into the top of the absorber 5.

The remainder of the hot lean oil, about 1 per cent or less, for example 0.1% of the total daily throughput, is delivered by pump 21, through valve 7 and line 6 into the interior of distilling vessel 2. In this vessel, the very small stream of hot lean oil is caused to evaporate by meeting an upward rising current of rich untreated gas issuing from orifices 20. A portion of the rich, untreated inlet gas from gas header 10 bypasses the absorption tower 5, passes through line 8 controlled by valve 9 into spray orifices 20 for injection into the body of hot impure absorption oil to assist in the distillation thereof, as mentioned above. Both the gas and oil within vessel 2 are maintained at an elevated temperature by indirect transfer of heat from the main hot oil stream through heat exchanger 3. The gas in line 8 is shown as coming from the main rich gas header 10, but it may be any hydrocarbon gas from any source which will ultimately be treated either in the main absorber of the plant or in any so called "reabsorber" which is fed with oil from the main plant cycle. The major part of the untreated rich gas from header 10 flows through line 11 into the base of the absorber 5, is there treated with the lean oil in the conventional manner, and the residue gas from the absorption step leaves absorber 5 through residue gas line 12 as controlled by back pressure regulator 13. Rich oil from the absorber, as controlled by level controller 14, passes by line 15 through pumps, exchangers, heaters, stripping still, etc. (not shown). Valve 19 in rich gas line 11 is maintained slightly constricted, so that pressure in header 10 is slightly higher than in line 11 to force gas through line 8, valve 9 and orifices 20 into still 2.

By reduction of partial pressure of the oil vapor in vessel 2 while the oil therein is held at a relatively constant elevated temperature, the oil entering by line 6 is vaporized with the exception of the high boiling impurities dissolved therein and extraneous nonvolatile solid matter either dissolved or entrained. The extent to which evaporation of this very small portion or modicum of oil is carried is governed, not by temperature, for the temperature in vessel 2 is substantially that of the plant hot oil line and is substantially constant, but is instead governed by the operation of valve 9 which admits more or less gas and thereby lowers the partial pressure of oil vapor in vessel 2 if it be desirable to vaporize a larger percentage of the oil entering, or raises the partial pressure of oil vapor in 2 if it be desired to vaporize a smaller percentage. Ordinarily 95% to 98% of the oil entering vessel 2 will be vaporized. The unvaporized bottoms may be allowed to accumulate for some time and be drawn off intermittently through line 16 as controlled by valve 17. As a refinement, which is not in reality necessary, one plate of conventional bubble cap type may be inserted above the oil level in vessel 2 to avoid a slight loss of unevaporated good oil at the intermittent times when bottoms are being drained.

The oil vapors from vessel 2, together with the gas which governs, by its controlled volume, the partial pressure of oil vapors in the combined stream, flows by line 18 into line 11 and thereby enters the base of the absorber 5. In this absorber, the oil vapors are condensed, or dissolved, or both, in the large stream of relatively cold downward flowing absorption oil. The water vapor in 18, derived from emulsion in the oil vaporized in vessel 2, has a very low partial pressure, and this very low partial pressure is further reduced when this vapor is united with the remainder of the rich, untreated gas flowing through line 11 into the bottom of the absorber. The partial pressure of this water vapor is so very low that said water vapor or moisture is not condensed on contact with the downflowing absorption oil, and being insoluble therein, is carried through absorber 5 in the gaseous phase and leaves the system with the residue gas through the residue gas outlet 12.

The operation according to my invention depends upon the following facts and physical relations which will be evident to those skilled in the art.

Oil customarily used in such absorption plants has an average molecular weight of about 200 and it is considered in the art that on the average one pound mol of oil equals 30 gallons. With a final boiling point at atmospheric pressure of about 450° F. of the oil which it is intended to vaporize, the equilibrium vapor pressure of the liquid phase in the still or vessel 2 will be about three pounds absolute at 325° F. The minimum average operating temperature on hot lean oil lines in existing plants of old design is about 290° F., and on newer plants, it is from 320° F. upwards, so the maintenance of temperature in vessel 2 of 325° F., is a conservative assumption in line with the more modern plant design. An absorber operating pressure of 45 pound gauge or 60 pounds absolute is common in many plants.

With the vapor pressure of oil three pounds absolute at 325° F., oil at this temperature will evaporate into the stripping gas stream to the extent of one gallon of oil per 370 cubic feet of gas at an operating pressure of 60 pounds absolute or about 45 pounds per square inch gauge. In the reclamation of 500 gallons of absorption oil per day under the above distillation conditions and in an absorption plant circulating 500,000 gallons absorption oil per day, the temperature rise in the absorber occasioned by passage of the oil vapors and stripping gas into the absorber is less than one degree Fahrenheit.

Although the process as herein disclosed is set forth as applicable to low pressure absorption plants, it is obvious that it may operate at substantially higher pressures. This latter embodiment is applicable in cases where the absorber pressure is the result of compressing the gas. In an absorption plant treating compressed gas, the gas in line 8 should be hot gas taken from the compressor discharge before cooling and not from the absorber header as shown. Also, line 18 should, in this case, lead first into a gas cooler and from there to the absorber. In such an operation, it is sound in principle to pass through vessel 2 any amount of gas desired from that herein disclosed up to the entire amount of gas fed to the absorber and yet remain within the scope of my invention.

In another embodiment, high stage compressor accumulator vapors may be used as the stripping medium.

It is impractical to pass the necessary volume of open steam to carry out such a distillation into the abosrber on account of the great heat content of the steam and also on account of the emulsification it would cause.

The use of hot lean oil in exchanger system 3 for heating the impure absorption oil and stripping gas in still 2 may involve complicated heat exchangers and auxiliary equipment. In case this means of supplying heat is considered impractical, I favor the use of live steam in said exchanger since the exchanger or coils may be one relatively small unit, and for the heating of the aforementioned 500 gallons absorption oil per day to 325° F., only two boiler horsepower is required.

As mentioned heretofore, booster pump 21 delivers hot lean oil from the main hot lean oil line 1 into the purifying still 2. In case it is undesirable to install an additional pump, as pump 21, the lean oil for purification may be taken directly from the main stream previous to cooling, or following the coolers, in which latter case, the cooled lean oil must be reheated for distillation in purification still 2. However, this reheating of 500 gallons lean oil per day requires a negligible amount of steam.

My process is also adaptable for use in plants having fire stills and no steam and since in such cases the hot oil lines are at higher temperatures, less partial pressure gas would be required to vaporize or distill a given amount of the impure absorption oil.

Although I have disclosed my invention using as an example the continuous evaporation or distillation of 0.1% of the absorption oil, I do not wish to be limited in this respect since it may be necessary to distill slightly more than 0.1% or even less than 0.1% of the impure absorption oil in order to maintain the oil in its maximum absorptive condition.

As may be seen by those skilled in the art, many variations and modifications of my process may be practiced and yet remain within the intended spirit and scope of my invention.

I claim:

1. A method for the purification of used absorption oil comprising the steps of diverting a small portion of the hot denuded absorption oil to a still, distilling this small portion of hot denuded absorption oil by heat from heat exchange with the remaining portion of the hot denuded absorption oil and by passing untreated hydrocarbon gas therethrough to produce an impure absorption oil bottoms, and a purified overhead absorption oil and untreated hydrocarbon gas vaporous mixture, combining this vaporous mixture with additional untreated hydrocarbon gas, passing this vaporous mixture with additional untreated hydrocarbon gas to the absorber and removing the impure absorption oil bottoms.

2. A method for the purification of used absorption oil comprising the steps of diverting a small portion of the hot denuded absorption oil to a still, distilling this small portion of hot denuded absorption oil by heat from heat exchange with the remaining portion of the hot denuded absorption oil and by passing untreated hydrocarbon gas to be treated by absorption, therethrough, to produce an impure absorption oil bottoms, and a purified overhead absorption oil and untreated hydrocarbon gas vaporous mixture, combining this vaporous mixture with additional untreated hydrocarbon gas to be treted by absorption, passing this combined vaporous mixture and additional untreated hydrocarbon gas to be treated by absorption, to the absorber and removing the impure absorption oil bottoms.

3. A method for the purification of used absorption oil comprising the steps of diverting less than 1% of the hot denuded absorption oil to a still, distilling this less than 1% of the hot denuded absorption oil by heat from heat exchange with the remaining portion of the hot denuded absorption oil and passing untreated hydrocarbon gas therethrough to produce an impure absorption oil bottoms, and a purified overhead absorption oil and untreated hydrocarbon gas vaporous mixture, combining this vaporous mixture with additional untreated hydrocarbon gas, passing this vaporous mixture with additional untreated hydrocarbon gas to the absorber and removing the impure absorption oil bottoms.

4. A method for the purification of used absorption oil comprising the steps of diverting less than 1% of the hot denuded absorption oil to a still, distilling this less than 1% of the hot denuded absorption oil by heat from heat exchange with the remaining portion of the hot denuded absorption oil, and by passing untreated hydrocarbon gas to be treated by absorption, therethrough, to produce an impure absorption oil bottoms, and a purified overhead absorption oil and untreated hydrocarbon gas vaporous mixture, combining this vaporous mixture with additional untreated hydrocarbon gas to be treated by absorption, passing this combined vaporous mixture and additional untreated hydrocarbon gas to be treated by absorption, to the absorber and removing the impure absorption oil bottoms.

5. A method for the purification of used absorption oil comprising the steps of diverting less than 1% of the hot denuded absorption oil to a still, distilling this less than 1% of the hot denuded absorption oil by heat from heat exchange with the remaining portion of the hot denuded absorption oil and by passing untreated hydrocarbon gas therethrough to produce an impure absorption oil bottoms, and a purified overhead absorption oil and untreated hydrocarbon gas vaporous mixture, combining this vaporous mixture with additional untreated hydrocarbon gas, passing this vaporous mixture with additional untreated hydrocarbon gas to the absorber, and controlling the rate of distillation of the less than 1% of the denuded absorption oil by controlling the rate of passage of the untreated hydrocarbon gas through the still, the oil being maintained at approximately the constant temperature of the hot denuded absorption oil by the said heat exchange and removing the impure absorption oil bottoms.

6. A method for the purification of used absorption oil comprising the steps of diverting less than 1% of the hot denuded absorption oil to a still, distilling this less than 1% of the hot denuded absorption oil by heat from heat exchange with the remaining portion of the hot denuded absorption oil, and by passing untreated hydrocarbon gas to be treated by absorption, therethrough, to produce an impure absorption oil bottoms, and a purified overhead absorption oil and untreated hydrocarbon gas vaporous mixture, combining this vaporous mixture with additional untreated hydrocarbon gas to be treated by absorption, and passing this combined vaporous mixture and additional untreated hydrocarbon gas to be treated by absorption, to the absorber, and controlling the rate of distillation of the less than 1% of the denuded absorption oil by controlling the rate of passage of the untreated hydrocarbon gas through the still, the oil being maintained at approximately the constant temperature of the hot denuded absorption oil by the said heat exchange and removing the impure absorption oil bottoms.

SAMUEL C. CARNEY.